(12) United States Patent
Ding et al.

(10) Patent No.: US 7,638,577 B2
(45) Date of Patent: Dec. 29, 2009

(54) DISPERSING POLYMERS

(75) Inventors: Hong Ding, Hudson, OH (US); Weilin Tang, Solon, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 55 days.

(21) Appl. No.: 11/756,084

(22) Filed: May 31, 2007

(65) Prior Publication Data

US 2008/0011197 A1    Jan. 17, 2008

Related U.S. Application Data

(60) Provisional application No. 60/803,573, filed on May 31, 2006.

(51) Int. Cl.
   *C08G 18/62*    (2006.01)
   *C08G 73/16*    (2006.01)
   *C08K 5/00*     (2006.01)

(52) U.S. Cl. .................. 524/589; 525/415; 525/451; 528/367; 106/287.25; 106/505

(58) Field of Classification Search .............. 524/589; 106/287.25, 505; 525/415, 451; 528/367
   See application file for complete search history.

(56) References Cited

U.S. PATENT DOCUMENTS

| | | | | |
|---|---|---|---|---|
| 4,172,936 A | * | 10/1979 | Schafer et al. | 528/49 |
| 4,192,926 A | * | 3/1980 | Schafer et al. | 521/163 |
| 5,288,828 A | | 2/1994 | Harris et al. | |
| 5,360,856 A | | 11/1994 | Harris et al. | |
| 5,430,089 A | | 7/1995 | Harris et al. | |
| 5,554,682 A | | 9/1996 | Harris et al. | |
| 5,648,124 A | | 7/1997 | Sutor | |
| 5,852,123 A | | 12/1998 | Huybrechts | |
| 5,998,535 A | | 12/1999 | Haldankar | |
| 6,037,414 A | | 3/2000 | Simms et al. | |
| 6,326,449 B1 | | 12/2001 | Haldankar | |
| 6,503,307 B1 | * | 1/2003 | Noguchi | 106/31.27 |
| 6,852,803 B2 | | 2/2005 | Ma | |
| 7,252,710 B2 | * | 8/2007 | Kano et al. | 106/499 |
| 2003/0225207 A1 | | 12/2003 | Ma | |
| 2005/0054752 A1 | | 3/2005 | O'Brien et al. | |
| 2005/0284335 A1 | * | 12/2005 | Kano et al. | 106/476 |
| 2006/0098066 A1 | | 5/2006 | Bauer | |

FOREIGN PATENT DOCUMENTS

| | | |
|---|---|---|
| EP | 1354911 A1 | 10/2003 |
| EP | 1371698 A1 | 12/2003 |
| EP | 1484366 A1 | 12/2004 |

OTHER PUBLICATIONS

PCT International Searching Authority, PCT International Search Report and Written Opinion, Dec. 13, 2007.
GEO Specialty Chemicals, DICAP Acid Polyester Polyols, date unknown.
Solvay S.A., Solvay Caprolactones, available at least as early as Aug. 24, 2004.

* cited by examiner

*Primary Examiner*—Mark Eashoo
*Assistant Examiner*—Noah Frank
(74) *Attorney, Agent, or Firm*—Eryn Ace Fuhrer; Robert E. McDonald; Deron A. Cook

(57) ABSTRACT

A pigment dispersing polymer comprising a backbone having one or more urea groups and having polymeric side chains extending therefrom. The dispersing polymer may be formed from the reaction of a compound having one or more carbodiimide groups with acid functional resins such as acid functional polyesters, acid functional acrylics, acid functional polyethers, and fatty acids.

9 Claims, No Drawings

DISPERSING POLYMERS

This application claims priority from co-pending U.S. Provisional Application No. 60/803,573 filed May 31, 2006, the entirety of which is hereby incorporated by reference.

BACKGROUND

In general, coating compositions comprise a carrier liquid, a film forming polymer, a crosslinking (curing) agent, pigments, extenders, and various additives, including but not limited to pigment dispersing agents etc. Pigments are insoluble particles, which are dispersed in the carrier liquid to provide properties such as color, opacity, hardness, durability, and corrosion resistance. Pigments may be natural, synthetic, inorganic, or organic particles, which may be finely ground, such as in the form of a powder. Extenders are fillers for the coating composition that are often used to reduce cost, increase durability, alter appearance, control rheology and may influence other properties of the coating composition. As used herein, the term "pigment" should be understood to include both pigment and extender particles.

The coating of a pigment particle surface with the carrier liquid is referred to as "wetting" or "dispersing" the pigment. The resulting mixture of pigment particles suspended in the carrier liquid is generally referred to as a "pigment dispersion." If the pigment is not properly dispersed, clusters of pigment particles held together by surface forces may be present. Such a condition is commonly referred to as "agglomeration." The clusters of pigment particles may be broken up by the application of mechanical forces and stabilized by the addition of pigment dispersants. Pigment dispersants, also known as dispersing agents, increase the stability of a suspension of pigments in a liquid medium. Pigment dispersants also affect the interface between the carrier liquid and the pigment particle, thereby reducing "flocculation", which is the formation of clusters of pigment particles after the particles have been dispersed.

DETAILED DESCRIPTION OF THE INVENTION

This invention relates to a novel polymeric dispersant and pigment dispersions and coating or pigmented compositions incorporating the dispersant. The dispersant is adapted for dispersing pigments in a carrier liquid and is compatible with a wide variety of film-forming polymers.

The present invention relates to a pigment dispersing polymer having a general formula:

Formula I

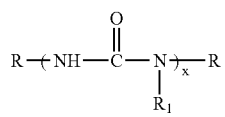

In general the pigment dispersing polymer of the present invention comprises a backbone comprising at least one urea group and one or more side chains. The dispersing polymer of the present invention may be formed by any reaction capable of forming a backbone comprising one or more urea groups having side chains extending therefrom. In one embodiment, the dispersing polymer may be formed by the reaction of (A) a carbodiimide containing compound with (B) an acid functional resin. The acid functional resin forms the side chains $(R_1)$ of the dispersing polymer. The acid functional resins may be polymers including but not limited to polyesters, fatty acids, polyethers, and acrylics.

The backbone of the pigment dispersing polymer is formed from a polymer containing at least one reactive carbodiimide group. As used herein, compounds containing one or more carbodiimide groups may be used. In one embodiment of the invention, a useful carbodiimide contains multiple repeating carbodiimide groups. For example, in one embodiment of the invention, the number of carbodiimide groups is greater than or equal to 4, such that in Formula 1, X may be greater than or equal to 4. Exemplary commercially available carbodiimide compounds include Zoldine XL-29SE available from Dow Chemical, and Carbodilite V-02, V-04, E-01 and E-02, all available from Nissinbo.

Carbodiimides react with carboxylic acids to form acylurea groups. To form the pigment dispersant, the carbodiimide containing polymer may be reacted with any resin having carboxylic acid functionality, for example, acid functional polyesters, fatty acids, acid functional polyethers, and acid functional acrylics. The resins with carboxylic acid functionality provide the side chains $(R_1)$ on the pigment dispersing polymer. For example, the side chains $(R_1)$ may comprise polyesters such as Formula 2

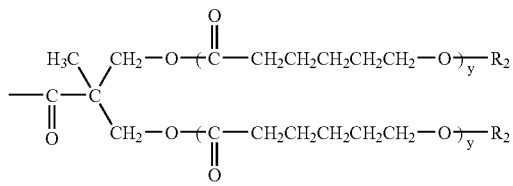

wherein $R_2$ is H, or any alkyl group, or an ester chain. Y may be any integer, for example about 1 to about 20. The side chains $(R_1)$ may also comprise polyethers such as Formula 3

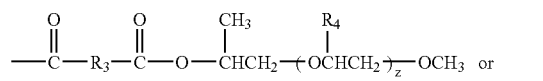 or

Formula 4

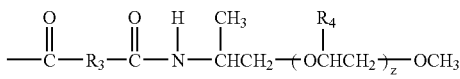

or fatty acids. $R_3$ may comprise any alkyl group and Z may be any integer, for example about 5 to about 60. $R_4$ may be H, or $CH_3$, or mixtures thereof. It should be understood that in the present invention, the pigment dispersing polymer may include blends of polymers containing one or more of the foregoing side chains or other side chains.

Acid functional polyesters used in preparing the pigment dispersant can be prepared by several known methods. In one useful embodiment, the acid functional polyesters are monofunctional acids, meaning that they contain only one carboxylic acid group.

The methods of making polyester resins are well-known. Typically, a polyol component and an acid and/or anhydride component are heated together, optionally with a catalyst, and usually with removal of the by-product water in order to drive the reaction to completion. In general, the polyol component may have an average functionality of at least about two. The polyol component may contain mono-functional, di-functional, tri-functional, and higher functional alcohols. In one embodiment, diols may be used. In another embodiment, when some branching of the polyester is desired, higher functionality alcohols may be used. Illustrative examples of such include, without limitation, alkylene glycols and polyalkylene glycols such as ethylene glycol, propylene glycol, diethylene glycol, triethylene glycol, and neopentyl glycol, 1,4-butanediol, 1,6-hexanediol, 1,4-cyclohexane dimethanol, glycerine, trimethylolpropane, trimethylolethane, pentaerythritol, 2,2,4-trimethyl-1, 3-pentanediol, hydrogenated bisphenol A, and hydroxyalkylated bisphenols. polyether polyols, polycaprolactone polyols and saturated and unsaturated polyols. Representative polyol diluents include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

The acid and/or anhydride component may comprise compounds having an average at least two carboxylic acid groups and/or anhydrides of these. In some embodiments, dicarboxylic acids or anhydrides of dicarboxylic acids may be used. However, higher functional acid and anhydrides may also be used when some branching of the polyester is desired. Suitable polycarboxylic acid or anhydride compounds include, without limitation, those having from about 3 to about 20 carbon atoms. Illustrative examples of suitable compounds include, without limitation, phthalic acid, isophthalic acid, terephthalic acid, hexahydrophthalic acid, tetrahydrophthalic acid, pyromellitic acid, succinic acid, azeleic acid, adipic acid, 1,4-cyclohexanedicarboxylic acid, dodecane-1, 12-dicarboxylic acid, citric acid, trimellitic acid, and anhydrides thereof.

Acid functional polyesters, which may be useful in the present invention, may be made by reacting a dibasic (dicarboxylic) acid (generally having a chemical formula of HOOC—R—COOH) with a diol to form acid functional polyesters, which may be monoacid functional or diacid functional. In one embodiment of the invention, a molar equivalent of dibasic acids and diols may be reacted to form monoacid functional polyesters. In an alternative embodiment, a molar excess of a dibasic acid may be reacted to form diacid functional polyesters. In such an embodiment, in order to achieve a mono-acid functional polyester, diacid functional polyesters can be reacted with a mono-functional alcohol, such as hexanol, cyclohexanol, benzyl alcohol, stearyl alcohol, oleyl alcohol, undecanol, and ethylene glycol butyl ether to cap one of the acid groups on the diacid functional polyester. Another way to form an acid functional polyester is to react dibasic acid with a molar equivalent amount of diols, while monitoring the acid value of the product in the reaction vessel. The reaction can be stopped when the product has a desired acid value. In one embodiment, the desired acid value may indicate a high concentration of acid functional resin.

Another method of forming a mono-acid functional polyester involves the lactone or polycaprolactone ring opening polymerization initiated by hydroxy-functional acid. In general such polyesters will also have a terminal hydroxyl group or groups.

For example, the ring opening polymerization of caprolactone initiated by 2-2'-bis(hydroxymethyl) propionic acid (also referred to as dimethylol propoionic acid or DMPA) provides a useful way to make a monoacid functional polyester. Another useful reaction is between dimethylolbutyric acid and caprolactone to form a carboxyl modified polycaprolactone, in particular a polycaprolactone polyester diol with a pendant carboxylic functional group. Other hydroxy-functional carboxylic acids and lactones may also be used to form useful acid functional polyesters for making the pigment dispersant. Without being limited to any particular theory, the extent of caprolactone modification believed to be most useful is by having a resulting number average molecular weight measured by gel permeation chromatography using polystyrene as a standard ("GPC") of over about 500, for example, about 1000 to about 6000. The use of these polyesters has the advantage of providing hydroxyl groups on the side chains for subsequent reaction with melamine, isocyanate, or anhydride crosslinkers. Examples of commercially available acid functional polycaprolactone polyester diols include CAPA polyester diols available from Solvay and DICAP polyester diols available from GEO Speciality Chemicals.

Polyesters of caprolactone using 2-ethylhexanol as the initiating alcohol and dibutyl tin dilaurate as the catalyst reacted with a cyclic anhydride to form a terminal acid group may also be useful in the present invention.

In another useful embodiment, an acid functional polycaprolactone polyester diol may be modified by capping one or both hydroxyl groups using one or more mono-functional acids, R—COOH. In one useful embodiment, R may have about 4 to about 18, for example, about 11 to about 12 carbon atoms. Examples of useful mono-functional carboxylic acids include lauric acid, caprylic acid, capric acid, myristic acid, palmitic acid, stearic acid, oleic acid, elaidic acid (9-octadecenoic acid), linoleic acid, linolenic acid, stealoric acid, soya fatty acid or other fatty acids. This creates a polyester such as those in Formulas 2, wherein $R_2$ is an ester chain (O═C—R) from any of the above referenced acid groups. In one useful embodiment, two moles of such a mono-functional acid may react with the hydroxyl groups of the polyester to form a mono-acid functional polyester, where both hydroxyl groups are capped by the ester chains.

Acid functional epoxy esters may also be useful in the present invention. In one embodiment, useful epoxy esters may be formed by the reaction of one mole of mono-functional epoxy, such as CARDURA E10 from Hexion Specialty Chemicals, Inc, with one mole of a diacid.

In another embodiment of the present invention, fatty acids may be used. For example, fatty acids having from about 12 to about 18 carbon atoms such as caprylic acid, capric acid, lauric acid, myristic acid, palmitic acid, stearic acid, oleic acid, elaidic acid (9-octadecenoic acid), linoleic acid, linolenic acid, stealoric acid or blends thereof, for example, soya fatty acid or other fatty acids, may be useful to react with carbodiimide groups to form the pigment dispersant of the present invention.

In another embodiment, suitable acid functional resins may be prepared by the reaction of anhydride with mono-hydroxyl functional polyethers or mono-amino functional polyethers, such as monoethers of polypropylene glycols, polyetheylene glycols, and their co-polymers, JEFFAM- INE® monoamines available from Huntsman. Suitable anhydrides include but are not limited to succinic anhydride, maleic anhydride, phthalic anhydride, hexahydrophthalic anhydride, and trimelitic anhydride and the like. Such a reaction produces a mono-acid functional glycol which is capable of reacting with a carbodiimide group.

The acid number of useful acid functional resins is usually between about 5 and about 100, for example, about 20 to about 60, further for example about 30.

To form the dispersing polymer of the present invention the carbodiimide compound and the acid functional resin are combined and may react at room temperature or may be heated to about 80° C. to about 120° C., for example about 85° C. to about 90° C., in the presence of solvent. Typical solvents that can be used are ketones, such as methyl ethyl ketone, methyl propyl ketone, methyl isobutyl ketone, methyl amyl ketone, and acetone; alcohols such as methanol, ethanol, isopropanol, and butanol; esters such as ethyl acetate and butyl acetate; glycols such as ethylene glycol and propylene glycol; ethers such as tetrahydrofuran, ethylene glycol monobutyl ether, and propylene glycol methylether; and mixed ether acetates such as propylene glycol methylether acetate, diethylene glycol monobutyl ether acetate, and the like. Also, aromatic solvents, such as toluene, xylene, naphtha, and mixtures of the various solvents listed herein may also be used. The reaction between the carbodiimide compound and the acid functional resin may take up to about 3 to about 7 hours to complete. It is contemplated that the reaction is complete when the acid value plateaus (stops decreasing) as measured by acid value titration.

The carbodiimide and acid functional resin may be combined in a molar ratio of carbodiimide to carboxylic acid of about 0.5:1 to about 5:1, for example, about 1:1, about 1.5:1, and about 2:1. In one useful embodiment, the acid value of the pigment dispersing polymer is 0 to about 50, for example, 0 to about 10. The number average molecular weight measured by GPC of the pigment dispersing polymer is at least about 500 to about 50,000, for example about 2000 to about 20,000, further for example, about 3000 to about 12,000 and even further for example about 3000 to about 6000.

Without being limited to any particular theory, it is believed that the dispersing polymers of the present invention have a comb structure comprising the urea backbone and the polymeric side chains extending therefrom. It is believed that the urea backbone provides multiple anchoring sites for the pigments while the polymeric side chains provide an elastic layer around the pigments.

The dispersing polymer of the present invention may be used to form a pigment dispersion for use in various applications such as paints and inks. In one embodiment, pigments may be added to a carrier liquid containing the dispersant and the pigments are dispersed in the carrier liquid using conventional techniques such as high speed mixer, ball milling, and continuous mills. The resulting pigment dispersion has a dispersant to pigment weight ratio of about 1% to about 200%.

Any of the conventional pigments used in paints can be used to form the pigment dispersion of the present invention, including but not limited to various organic and incorganic pigments such as titanium dioxide; carbon black; graphite black; transparent and opaque iron oxide reds and yellows; nickel titanate yellows; bismuth vanadate yellows; quinnacridone reds, magentas and purples; phthalocyanine copper blues and greens; naphthlenolato copper yellow; isoindolinone yellow; benzimidazolone yellows and oranges; diketo pyrrolo pyrolle oranges and reds; anthraquinone red; oxazine violet; indanthrone blue; metallic pigments, such as aluminum and paliochromes; and opalescent pigments, such as micas and xirallics. Metallic pigments also include but are not limited to fine and coarse aluminums, cornflake to pancake aluminums, and colored aluminums. Other useful pigments include, but are not limited to silica, clay, talc, calcium carbonate, barium sulfate, and anti-corrosive pigments, such as zinc phosphate.

It may be desirable to add other optional ingredients to the pigment dispersion such as antioxidants, flow control agents, rheology control agents such as fumed silica, microgels, UV stabilizers, screeners, quenchers, and absorbers.

Pigment dispersants of this invention can be used in a variety of solvent borne and waterborne coating compositions such as primers, primer surfacers, topcoats, which may be monocoats or basecoats of a clearcoat/basecoat finish. These compositions may have acrylics, polyesters, epoxy resins, polyurethane dispersions, acrylic-polyurethane dispersion hybrids, alkyds, modified alkyds, or a blend of these types of coating vehicles as the film forming constituent and may also contain crosslinking agents such as isocyanates, melamines, amino resins, and the like. It may be desirable to have functionalities on the dispersing polymer that react with the crosslinker or hardener. For example, hydroxyl functionality on the side chains of the pigment dispersant can react with hardeners such as melamimes or isocyanates.

The polymer of the present invention may also be useful as a compatibilizer to blend unlike or noncompatible resin systems, such as chlorinated polyolefin resins with hydroxy-functional resins.

The following examples illustrate the invention:

RESIN EXAMPLE R1

To a three-liter reactor, which was equipped with stirrer, condenser, thermocouple and nitrogen inlet, 1024.8 grams of a mono carboxylic acid functional polycaprolactone diol (DI-CAP 2020 from GEO Specialty Chemicals) was charged and was heated to 80° C. under nitrogen. Then, 660.6 grams of a polycarbodiimide having 4.5 repeating carbodiimide units (Zoldine XL-29SE from Dow Chemical) was added to the reactor. After the reaction mixture was held at 90° C. for three hours, 986.0 grams of xylene and 328.7 grams of propylene glycol methyl acetate were added and the solution was discharged. The reaction solution had a solid content of 44.3% by weight, Gardner color of 1, density of 8.22 lb/gal, acid value of 2.17 mg KOH/g, Gardner viscosity of G, Mn 5018 and Mw 16343 by GPC.

RESIN EXAMPLE R2

To a three-liter reactor, which was equipped with stirrer, condenser, thermocouple and sample and nitrogen inlets, 218.9 grams of hexahydrophthalic anhydride was charged and was heated to 130° C. under nitrogen blanket. 781.1 grams of methoxypolyethylene glycol (Carbowax 550) was gradually fed into the reactor over two hours. This reaction mixture "A" was then held at 130° C. for another two hours and was discharged. To a separate one-liter reactor, which was equipped with stirrer, condenser, thermocouple and nitrogen inlet, 224.4 grams of the reaction mixture "A" and 379.1 grams of Zoldine XL-29SE were charged and heated to 85° C. under nitrogen for three hours before discharge. The reaction solution had a solid content of 67.9% by weight, Gardner color of 3.1, density of 8.94 lb/gal, acid value of 4.0 mg KOH/g, Gardner viscosity of M, Mn 2378 and Mw 5646 by GPC.

RESIN EXAMPLE R3

To a five-liter reactor, which was equipped with stirrer, thermocouple, pack column, Dean-Stark receiver, condenser, and nitrogen inlet, 534.0 grams of neopentaglycol, 605.0 grams of 1,6-hexanediol, 1272.5 grams of adipic acid, 586.5 grams of dimer fatty acid and 1.9 grams of butyl stanoic acid were added. The reaction mixture was gradually heated to 210° C., while maintaining maximum packed column outlet temperature of 100° C. until the acid value reached 25 mg KOH/g. After cooling to 130° C., 557.4 grams of n-butyl acetate was added, and this reaction mixture "B" was discharged. To a separate one-liter reactor, which was equipped with stiffer, condenser, thermocouple and nitrogen inlet, 389.6 grams of the reaction mixture "B" and 118.8 grams of Zoldine XL-29SE were charged and were heated to 85° C. under nitrogen for three hours before discharge. The reaction solution had a solid content of 71.5% by weight, Gardner color of 1.9, density of 8.49 lb/gal, acid value of 7.8 mg KOH/g, Gardner viscosity of W, Mn 3550 and Mw 8829 by GPC.

RESIN EXAMPLE R4

To a one-liter reactor, which was equipped with stirrer, condenser, thermocouple and nitrogen inlet, 94.5 grams of Soya fatty acid and 438.5 grams of Zoldine XL-29SE were charged and were heated to 85° C. under nitrogen for five hours before discharge. The reaction solution had a solid content of 58.3% by weight, Gardner color of 4.0, density of 8.39 lb/gal, acid value of 10.7 mg KOH/g, Gardner viscosity of G, Mn 2070 and Mw 5081 by GPC.

RESIN EXAMPLE R5

To a one-liter reactor, which was equipped with stirrer, condenser, thermocouple and nitrogen inlet, 255.5 grams of a mono-acid functional polycaprolactone diol (DICAP 1000 from GEO Specialty Chemicals) was charged and was heated to 90° C. under nitrogen. Then, 216.2 grams of Zoldine XL-29SE was added to the reactor. After the reaction mixture was held at 90° C. for four hours. Then 528.3 grams of propylene glycol methyl acetate were added and the solution was discharged. The reaction solution had a solid content of 36.1% by weight, Gardner color of 1.4, density of 8.35 lb/gal, acid value of 13.0 mg KOH/g, Gardner viscosity of A1, Mn 2843 and Mw 6105 by GPC.

RESIN EXAMPLE R6

To a three-liter reactor, which was equipped with stirrer, condenser, thermocouple and nitrogen inlet, 422.1 grams of a mono-acid functional polycaprolactone diol (DICAP 2020) was charged and was heated to 80° C. under nitrogen. Then, 362.8 grams of Zoldine XL-29SE was added to the reactor. After the reaction mixture was held at 90° C. for four hours, 414.4 grams of xylene and 138.1 grams of propylene glycol methyl acetate were added and the solution was discharged. The reaction solution had a solid content of 44.5% by weight, Gardner color of 1.1, density of 8.25 lb/gal, acid value of 0.4 mg KOH/g, Gardner viscosity of G, Mn 4898 and Mw 18049 by GPC.

RESIN EXAMPLE R7

To a three-liter reactor, which was equipped with stirrer, condenser, thermocouple and nitrogen inlet, 418.8 grams of a mono-acid functional polycaprolactone diol (DICAP 1000) was charged and was heated to 90° C. under nitrogen. Then, 581.2 grams of Zoldine XL-29SE was added to the reactor. After the reaction mixture was held at 90° C. for four hours, 432.0 grams of xylene 144.0 and grams of propylene glycol methyl acetate were added and the solution was discharged. The reaction solution had a solid content of 44.9% by weight, Gardner color of 1.6, density of 8.31 lb/gal, acid value of 0.3 mg KOH/g, Gardner viscosity of E~D, Mn 3638 and Mw 10482 by GPC.

RESIN EXAMPLE R8

To a five-liter reactor, which was equipped with stirrer, thermocouple, horizontal condenser, receiver and nitrogen inlet, 175.2 grams of Lauric acid, 835.8 grams of a mono-acid functional polycaprolactone diol (DICAP 2020) and 1.1 grams of Fastcat 4100 were added. The reaction mixture was gradually heated to 180° C. and hold until the acid value reached 25 mg KOH/g. After cooling to 90° C., 589.0 grams of Zoldine XL-29SE was added. The reaction solution was hold for 2 hours before adding 1574.4 grams of xylene and 524.8 grams of propylene glycol methyl ether acetate. The reaction solution had a solid content of 32.7% by weight, Gardner color of 3.4, density of 7.94 lb/gal, acid value of 1.6 mg KOH/g, Gardner viscosity of A3, Mn 5063 and Mw 14775 by GPC.

RESIN EXAMPLE R9

To a two-liter reactor, which was equipped with stirrer, condenser, thermocouple and nitrogen inlets, 249.9 grams of Jeffamine M-2070 and 18.5 grams of hexahydrophthalic anhydride were charged and heated to 50° C. under nitrogen blanket. The reaction solution was hold for 2 hours before 100.9 grams of Soya fatty acid was added. After the mixture was heated to 80° C., 630.6 grams of Zoldine XL-29SE was charged and hold at 80° C. under nitrogen for three hours. Then, 140.0 grams of DI water was added before discharge. The reaction solution had a solid content of 60.5% by weight, Gardner color of 8, density of 8.69 lb/gal, acid value of 15.0 mg KOH/g, Gardner viscosity of V+, Mn 2839 and Mw 7156 by GPC.

PAINT EXAMPLE P1

To a 470 ml metal can, which was equipped with an air mixer with a Cowles blade, 169.74 grams of hydroxyl functional acrylic polymer (proprietary to the assignee of the present application), 22.46 grams of dispersant resin from Resin Example 1, and 60.73 grams of n-butyl acetate were charged and mixed for 10 minutes. To the above resin solution, 554.77 grams of titanium dioxide (R-706 from DuPont) were sifted in slowly under shear. After all the pigments were in, the Cowles blade was run at high shear for 60 minutes. Then, 138.88 grams of above hydroxyl functional acrylic polymer was added followed by 53.43 grams of n-butyl acetate. The mixture was subject to shear for 30 minutes following the last addition. Brookfield viscosity of the paint was recorded and is listed in Table I.

PAINT EXAMPLE P2

To a 470 ml metal can, which was equipped with an air mixer with a Cowles blade, 257.40 grams of hydroxyl functional acrylic polymer proprietary to the assignee of the present application), 38.39 grams of dispersant resin from Resin Example 1, and 132.19 grams of n-butyl acetate were charged and mixed for 10 minutes. To the above resin solution, 346.81 grams of Talc (BT2004 from IMI FABI, LLC) were sifted in slowly under shear. After all the pigments were in, the Cowles blade was run at high shear for 60 minutes. Then, 171.60 grams of above hydroxyl functional acrylic polymer and 53.60 grams of n-butyl acetate were added to the above slurry under shear for 30 min. Brookfield viscosity of the paint was recorded and is listed in Table I.

PAINT EXAMPLE P3

To a 470 ml metal can, which was equipped with an air mixer with a Cowles blade, 267.39 grams of hydroxyl functional acrylic polymer (proprietary to the assignee of the present application), 39.88 grams of dispersant resin from Resin Example 1, and 120.99 grams of n-butyl acetate were charged and mixed for 10 minutes. To the above resin solution, 344.41 grams of clay (Burgess Pigment Company) were sifted in slowly under shear. After all the pigments were in, the Cowles blade was run at high shear for 60 minutes. Then, 178.26 grams of above hydroxyl functional acrylic polymer and 49.06 grams of n-butyl acetate were added to the above slurry under shear for 30 min. Brookfield viscosity of the paint was recorded and is listed in Table I.

COMPARATIVE EXAMPLE C1

To a 470 ml metal can, which was equipped with an air mixer with a Cowles blade, 169.31 grams of hydroxyl functional acrylic polymer (proprietary to the assignee of the present application), 36.56 grams of Disperbyk-161 (from Byk Chemie), and 54.39 grams of n-butyl acetate were charged and mixed for 10 minutes. To the above resin solution, 553.37 grams of titanium dioxide (R-706 from Du Pont) were sifted in slowly under shear. After all the pigments were in, the Cowles blade was run at high shear for 60 minutes. Then, 138.53 grams of above hydroxyl functional acrylic polymer and 47.85 grams of n-butyl acetate were added to the above slurry under shear for 30 min. Brookfield viscosity of the paint was recorded and is listed in Table I.

COMPARATIVE EXAMPLE C2

To a 470 ml metal can, which was equipped with an air mixer with a Cowles blade, 256.29 grams of hydroxyl functional acrylic polymer (proprietary to the assignee of the present application), 62.40 grams of Disperbyk-161 (from Byk Chemie), and 117.49 grams of n-butyl acetate were charged and mixed for 10 minutes. To the above resin solution, 345.31 grams of Talc (BT2004 from IMI FABI, LLC) were sifted in slowly under shear. After all the pigments were in, the Cowles blade was run at high shear for 60 minutes. Then, 170.86 grams of above hydroxyl functional acrylic and 47.64 grams of n-butyl acetate were added to the above slurry under shear for 30 min. Brookfield viscosity of the paint was recorded and is listed in Table I.

COMPARATIVE EXAMPLE C3

To a 470 ml metal can, which was equipped with an air mixer with a Cowles blade, 266.19 grams of hydroxyl functional acrylic polymer (proprietary to the assignee of the present application), 64.81 grams of Disperbyk-161 (from Byk Chemie), and 105.78 grams of n-butyl acetate were charged and mixed for 10 minutes. To the above resin solution, 342.87 grams of clay (from Burgess Pigment Corn) were sifted in slowly under shear. After all the pigments were in, the Cowles blade was run at high shear for 60 minutes. Then, 117.46 grams of above hydroxyl functional acrylic polymer and 42.89 grams of n-butyl acetate were added to the above slurry under shear for 30 min. Brookfield viscosity of the paint was recorded and is listed in Table I.

TABLE I

|  | Paint of Example | | | | | |
| --- | --- | --- | --- | --- | --- | --- |
|  | P1 | C1 | P2 | C2 | P3 | C3 |
| Pigment | $TiO_2$ | $TiO_2$ | Talc | Talc | Clay | Clay |
| Dispersant/Pigment (volume/volume) | 6.5% | 6.5% | 12.0% | 12.0% | 12.0% | 12.0% |
| Non Volatile Content by Volume | 52.0% | 52.0% | 46.0% | 46.0% | 47.5% | 47.5% |
| Pigment Volume Concentration, % | 45.0% | 45.0% | 35.0% | 35.0% | 35.0% | 35.0% |
| Viscosity, cps (#4 Spindle at 50 rpm) | 664 | 1080 | 920 | 1292 | 524 | 544 |

The lower viscosity for Paint Examples 8-10 indicates that the dispersant of Resin Example 1 is more effective as a dispersant than the prior art commercially available dispersant for each of the individual pigments tested.

PAINT EXAMPLE P4

To a 470 ml metal can, weigh 66.34 grams of n-butyl acetate, 5.11 grams of Resin Example 2, 52.35 grams of hydroxyl functional acrylic polymer (proprietary to the assignee of the present invention). The mixture is stirred using a paint shaker for 5 minutes. Then 88.05 grams of barium sulfate, 79.97 grams of titanium dioxide, 35.99 grams of Talc, 32.68 grams of Kaolin clay, and 1.2 grams of carbon black were added. After shaking the slurry for 5 minutes with a paint shaker, 160 ml of steel media with 2 mm diameter were added into the can. The pigment grind was shaken for an additional 60 minutes. After the steel media was then filtered out, and 52.35 grams of hydroxyl functional acrylic polymer and 30.74 grams of polyester resin were added to the paint and homogenized by shaking. The paint properties are listed in Table II.

PAINT EXAMPLES P5 TO P9

Paint examples P5 through P9 were prepared in the same way as Paint Example P4 using the dispersants listed in Table II. The paint properties are listed in Table II.

COMPARATIVE EXAMPLE C4

Comparative paint example C4 was prepared in the same way as Paint Example P4 using the dispersant listed in Table II. The paint properties are listed in Table II.

TABLE II

| | \multicolumn{7}{c}{Paint Example} | | | | | | |
|---|---|---|---|---|---|---|---|
| | P4 | P5 | P6 | P7 | P8 | P9 | C4 |
| n-Butyl Acetate | 66.34 | 66.59 | 65.55 | 62.55 | 63.93 | 63.87 | 59.99 |
| Dispersant from Resin Example | R2 | R3 | R4 | R5 | R6 | R7 | Byk-161 |
| Amount | 5.11 | 4.56 | 5.70 | 9.09 | 7.45 | 7.55 | 12.19 |
| Hydroxy Functional Acrylic[1] | 52.35 | 52.35 | 52.35 | 52.35 | 52.34 | 52.35 | 52.35 |
| Barium Sulfate[2] | 88.05 | 88.05 | 88.05 | 88.05 | 88.04 | 88.05 | 88.05 |
| R-706 Titanium Dioxide[3] | 79.97 | 79.97 | 79.97 | 79.96 | 79.96 | 79.96 | 79.97 |
| TALC[4] | 35.99 | 35.99 | 35.99 | 35.99 | 35.98 | 35.99 | 35.99 |
| Kaolin Clay[5] | 32.68 | 32.68 | 32.68 | 32.68 | 32.68 | 32.68 | 32.68 |
| Carbon Black[6] | 1.20 | 1.20 | 1.20 | 1.20 | 1.20 | 1.20 | 1.20 |
| Hydroxy Functional Acrylic[1] | 52.35 | 52.35 | 52.35 | 52.35 | 52.34 | 52.35 | 52.35 |
| Polyester Polyol[1] | 30.74 | 30.74 | 30.74 | 30.74 | 30.73 | 30.74 | 30.74 |
| Dispersant/Pigment (volume/volume) | 4.5% | 4.5% | 4.5% | 4.5% | 4.5% | 4.5% | 4.5% |
| Non Volatile Content by Volume | 51.0% | 51.0% | 51.0% | 51.0% | 51.0% | 51.0% | 51.0% |
| Pigment Volume Concentration, % | 46.5% | 46.5% | 46.5% | 46.5% | 46.5% | 46.5% | 46.5% |
| Viscosity, #3 @ 50 rpm | 426 | 1418 | 272 | 312 | 242 | 226 | 340 |
| Average Particle Size, micron | 3.07 | 3.66 | 2.83 | 2.82 | 2.73 | 2.84 | 3.68 |
| % liquid layer on top of settling tube after 8 weeks at 120 F. | 11.8 | 5.6 | 11.8 | 7.1 | 5.6 | 7.1 | 28.6 |

[1] Proprietary to the assignee of the present application
[2] From SACHTLEBEN CORPORATION
[3] R-706 from Du Pont
[4] BT2004 from IMI FABI, LLC
[5] From BURGESS PIGMENT COMPANY
[6] From CABOT CORPORATION While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A polymer of the formula:

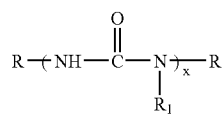

where R is any alkyl group; and
$R_1$ is one or more of:
a fatty acid,
or

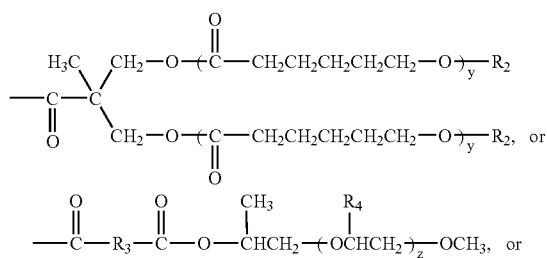

-continued

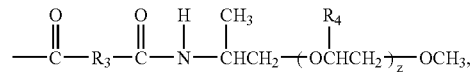

where $R_2$ is H, any alkyl group, or an ester chain, where $R_3$ is any alkyl group, and where $R_4$ is H, or $CH_3$ or mixtures thereof;

and wherein when the polymer and pigment are physically mixed the polymer is capable of dispersing pigment in a carrier liquid and wherein X and Y and Z are each independently any integer of 1 or greater.

2. The pigment dispersing polymer of claim 1, where X is greater than or equal to 4.

3. The pigment dispersing polymer of claim 1, where Y is about 1 to about 20.

4. The pigment dispersing polymer of claim 1, where Z is about 5 to about 60.

5. A dispersion comprising:
(a) at least one pigment;
(b) a carrier liquid; and
(c) a polymer of the formula:

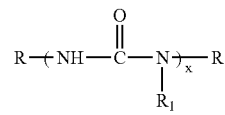

where R is any alkyl group; and
$R_1$ is one or more of:
a fatty acid, or

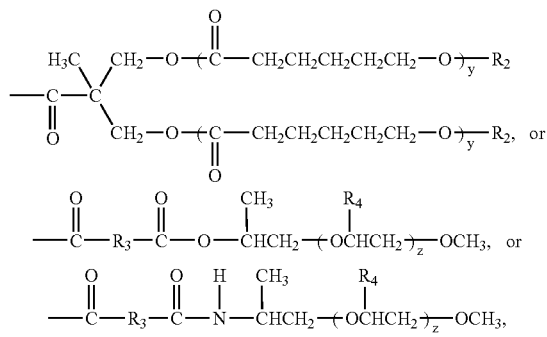

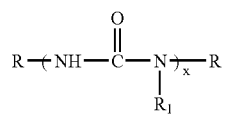

where $R_2$ is H, or any alkyl group, or an ester chain, where $R_3$ is any alkyl group, and where $R_4$ is H, or $CH_3$, or mixtures thereof; and wherein when the polymer and the at least one pigment are physically mixed, the polymer is capable of dispersing the at least one pigment in the carrier liquid and wherein X and Y and Z are each independently any integer of 1 or greater.

6. The dispersion of claim 5, wherein X is greater than or equal to 4.

7. A surface coating composition, said coating composition comprising:
(a) a polymer of the formula:

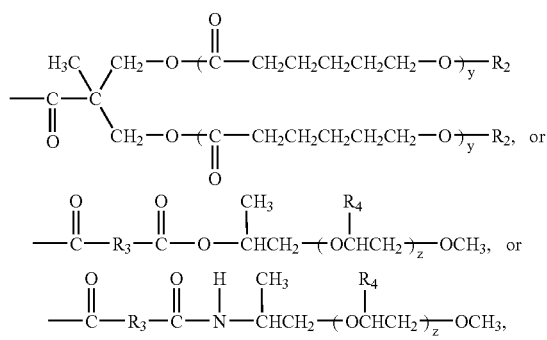

where $R_2$ is H, or any alkyl group, or an ester chain, where $R_3$ is any alkyl group, and where $R_4$ is H, or $CH_3$ or mixtures thereof;
(b) a pigment;
(c) a film forming polymer; and
(d) a carrier liquid, wherein when the polymer and pigment are physically mixed, the polymer is capable of dispersing the pigment in the carrier liquid and wherein X and Y and Z are each independently any integer of 1 or greater.

8. The surface coating composition of claim 7, said coating composition further comprising:
a crosslinker selected from melamine, isocyanate and anhydride or combinations thereof.

9. A method of dispersing pigment particles in a carrier liquid comprising:
providing a polymer of the formula:

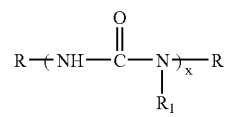

where R is any alkyl group; and
$R_1$ is one or more of:
a fatty acid, or

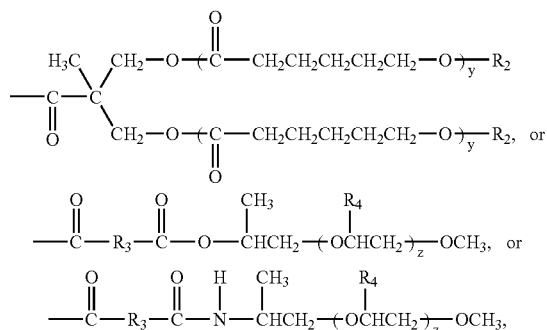

where $R_2$ is H, or any alkyl group, or an ester chain, where $R_3$ is any alkyl group, and where $R_4$ is H, or $CH_3$ or mixtures thereof; and
physically mixing said dispersing polymer and said pigment particles to disperse said pigment particles in said carrier liquid and wherein X and Y and Z are each independently any integer of 1 or greater.

* * * * *